(No Model.) 2 Sheets—Sheet 1.

D. GIBBONS.
GATE.

No. 270,565. Patented Jan. 9, 1883.

WITNESSES.
Chas. N. Leonard.
E. W. Bradford.

INVENTOR.
David Gibbons,
PER
C. Bradford,
ATTORNEY.

(No Model.) 2 Sheets—Sheet 2.
D. GIBBONS.
GATE.
No. 270,565. Patented Jan. 9, 1883.
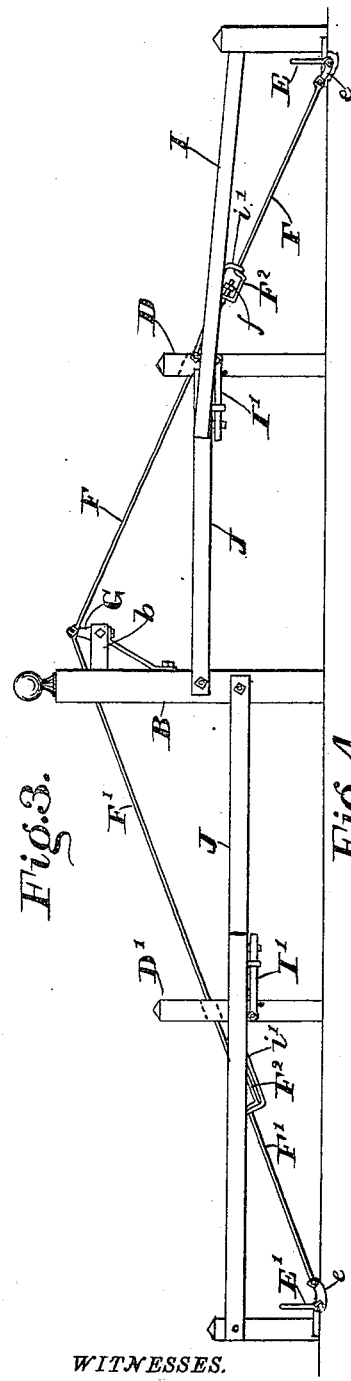
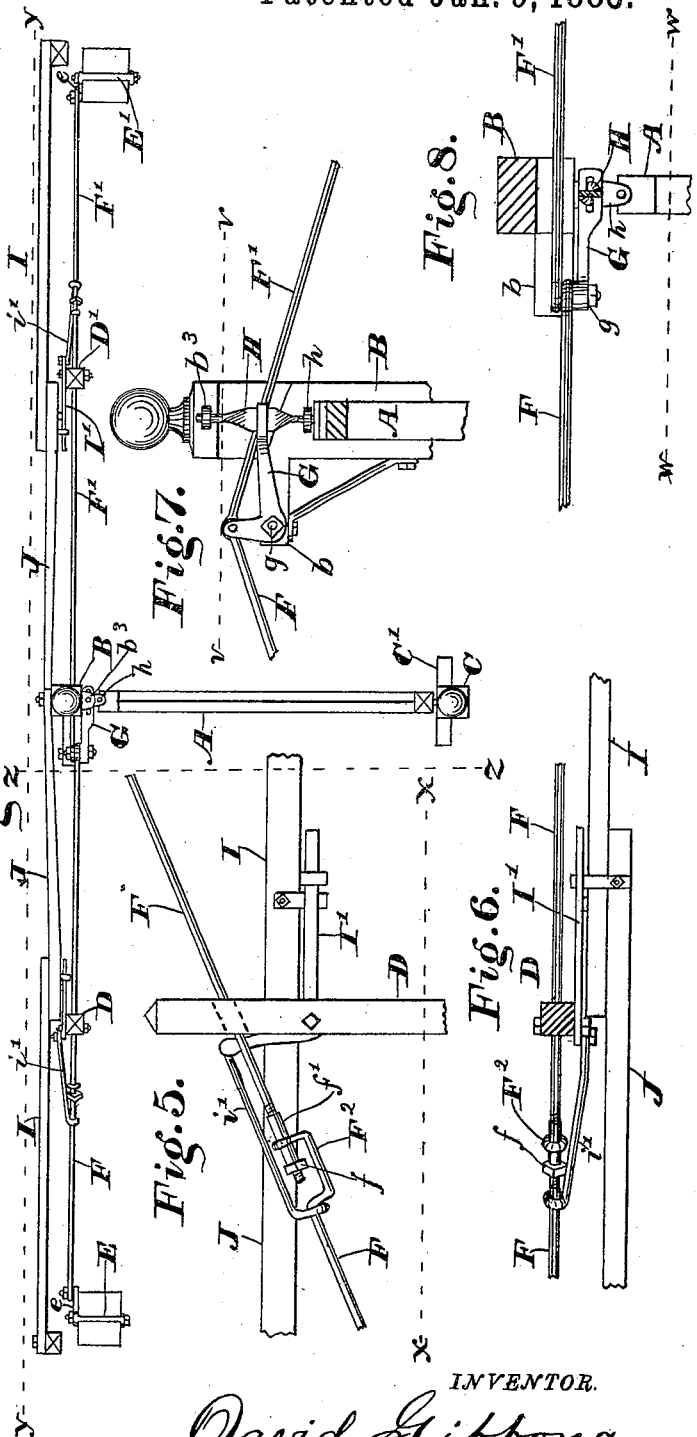
WITNESSES.
Chas. N. Leonard.
E. W. Bradford.
INVENTOR.
David Gibbons,
PER
C. Bradford,
ATTORNEY.

United States Patent Office.

DAVID GIBBONS, OF JOPPA, INDIANA, ASSIGNOR OF ONE-HALF TO HENRY H. MILLS, OF SAME PLACE.

GATE.

SPECIFICATION forming part of Letters Patent No. 270,565, dated January 9, 1883.

Application filed July 18, 1882. (No model.)

*To all whom it may concern:*

Be it known that I, DAVID GIBBONS, of Joppa, county of Hendricks, and State of Indiana, have invented certain new and useful Improvements in Gates, of which the following is a specification.

My said invention consists in certain improvements in the construction and arrangement of the mechanism of that class of gates known as "automatic gates," whereby such a gate is rendered very simple, durable, inexpensive, and capable of being easily operated, as will hereinafter be more specifically set forth.

Figure 1:
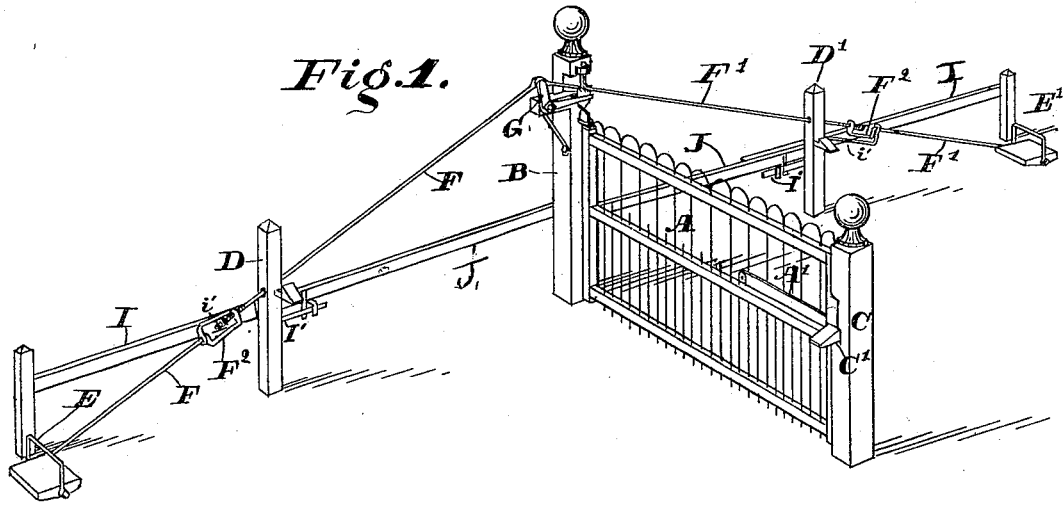
Figure 2:
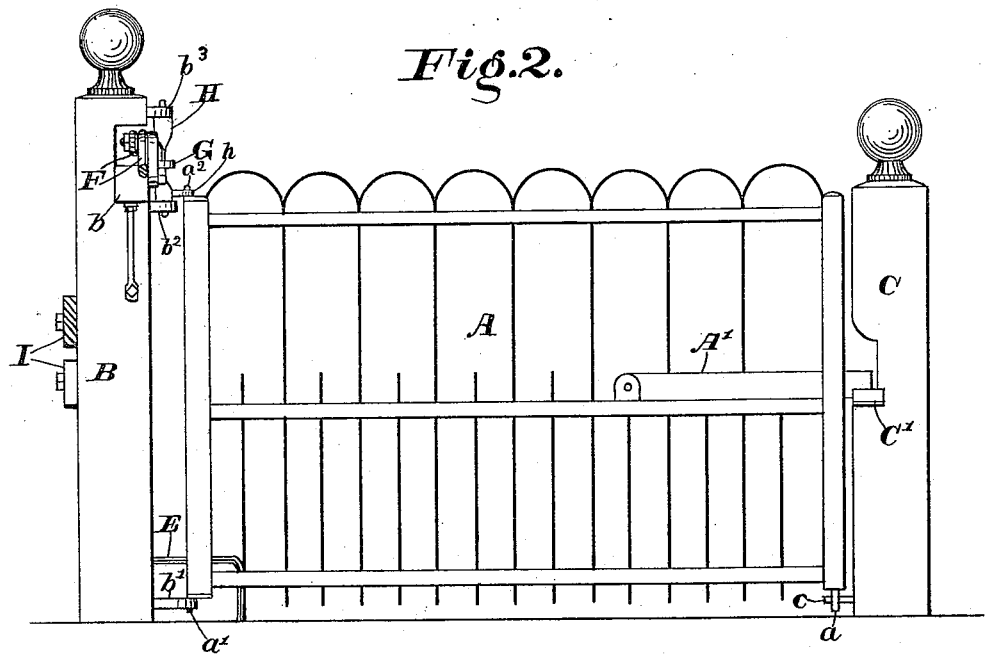

Referring to the accompanying drawings, which are made a part hereof, and on which similar letters of reference indicate similar parts, Figure 1 is a perspective view of a gate embodying my invention; Fig. 2, a side elevation of the gate proper as seen from the dotted line $zz$; Fig. 3, a rear side elevation of the operating mechanism as seen from the dotted line $yy$; Fig. 4, a top plan of the gate and operating mechanism; Fig. 5, a detail elevation, on an enlarged scale, of the sliding coupling in the operating-rod and surrounding parts; Fig. 6, an under side plan of the same as seen when looking upwardly from the dotted line $xx$; Fig. 7, a detail front elevation of the spiral device by which motion is imparted to the gate and surrounding parts, as seen from the dotted line $ww$; and Fig. 8, a horizontal section of the same, looking downwardly from the dotted line $vv$.

In said drawings, the portions marked A represent the gate proper; B, the post to which it is hung; C, the post against which it shuts; D D', the posts against which it swings when opened; E E', the trip-rods; F F', the rods running from the trip-rods to the mechanism by which the gate is immediately operated; G, a bell-crank lever, to which the rods F are connected; H, a spiral device on which the bell-crank lever operates, and I J rails which prevent animals from passing over the rods F, and also as weights to keep said rods and the trip-rods in position.

The gate A and posts B, C, D, and D' are severally of any ordinary or approved form, and are provided with the usual latch, hinge parts, and catches, respectively. The gate A has also a stop-pin, $a$, which comes in contact with a projection, $c$, on the post C, and thus stops the gate in shut position as it swings from either side, until said gate is raised so that said pin will pass over said projection by a further operation of the mechanism.

The trip-rods E E' are in the form of simple bails, except that they have arms $e$, to which the rods F F' are attached. As will be seen by an examination of the drawings, the point of attachment is farther from the top of the gate when the trip-rod is turned toward the gate than it is when the trip-rod is turned from the gate, and this is the means whereby the driving over a trip-rod toward the gate will operate the mechanism to open said gate, while driving over a trip-rod from the gate will operate the mechanism to close it. The rods F F' run from the trip-rods, passing through apertures in the posts D and D', to the mechanism which operates immediately on the gate, in the ordinary manner. They are, however, each provided with a sliding coupling, $F^2$, by means of which the top portion of one is permitted to move with the other without disturbing the bottom portion and the trip-rod attached thereto, or the trip-rod of either is permitted to make any movement except those designed to operate the gate without disturbing any other part except that portion of the rod attached immediately thereto.

The bell-crank lever G is pivoted to an arm, $b$, on the post B by a pivot, $g$. To one end of this lever both the rods F F' are connected, and the other end has a slit therein, which passes over the spiral device H. When this lever is operated by either of the rods F or F' this end moves up or down over the device H, and thus partly rotates said device, and thus throws the bearings of the gate out of plumb, and causes said gate to swing in one direction or the other.

The spiral device H is mounted in the bearings $b^2$ $b^3$ on the post B and turns therein. It has three flat places—one in the middle and one at each end—connected by spiral twists, making the body of the device in effect a spirally-twisted piece of flat metal. The upper and lower flat portions are at or about at right angles with the central flat portion, and consequently when the slitted portion of the bell-crank lever is moved from one of these portions to the other the whole device is turned one-fourth around, and its arm $h$, which serves as a bearing for the hinge-pintle $a^2$, is thus caused to tilt the gate until its latch $A'$ and projection $a$ become disengaged from the catch $C'$ and strike $c$, respectively, and then draws the gate around. The flat places at the ends and in the center of this device insure that the device shall revolve to an exact point, notwithstanding that the end of the bell-crank lever may move somewhat farther or not quite so far as would be required if the device were a true spiral from end to end.

The bars or beams I J are severally connected at one end to the post B at the rear of the gate and to the short posts near the trip-rods by pivot pins or bolts, as shown. The other ends of said bars, which pass alongside the posts D D', rest on the bell-crank levers I' and act as weight therefor. These bars or beams serve to keep cattle and other animals from crossing the rods F and thus disarranging or breaking them. As weights for the bell-crank levers I', they operate through said bell-crank levers, the short rods $i'$, and the lower portions of the rods F F' to keep the trip-rods E E' in upright position. The bell-crank levers are pivoted to the posts D D', and, as will be readily seen, any weight on the horizontal arm thereof will act on the rods F F' oppositely to the trip-rods. Said bell-crank levers are prevented from dropping or being forced down too far by suitable stops or pins (see Fig. 3) in the posts D D'. The short bars $i'$ are pivoted to the bell-crank levers I', and are looped around the rods F F' just below the sliding coupling $F^2$, as shown.

When the gate structure runs alongside a fence, and the bars are thus rendered unnecessary for their first-named purpose, a weight can be attached to the end of each bell-crank lever, which will serve the last-named purpose, and the bars can then be dispensed with.

The operation of my said invention may be recapitulated as follows: When the gate is in closed position the several parts are in the relation shown in the drawings, the slitted portion of the bell-crank lever G being in contact with the central flat portion of the device H. When a vehicle approaches from the right, or the side shown in the foreground in Fig. 1, and passes over the trip-rod E, it draws on the rod F and pulls the lever G around on its pivot $g$ until its slitted end is moved from the center to the top of the device H, and said device is thus turned one-fourth around, so that its arm $h$ points toward the opposite trip-rod, E'. This arm draws with it the top rear corner of the gate, thus lifting the front end thereof until its latch $A'$ and projection $a$ are enabled to pass the catch $C'$ and strike $c$, respectively, and also throwing it out of balance, so that it will swing back against the post D'.

After the vehicle has passed through the gate it strikes the trip-rod E', turning it outwardly and causing the lever G to return to the position where it will engage with the central flat portion of the device H and the gate to swing back to closed position. In approaching the gate from the other side, the vehicle, through the trip-rod E' and rod F', forces the lever still further down the device H to the lower flat portion, thus causing the gate to swing back against the post D in similar manner as it was before caused to swing toward the post D'. The rods F and F' are rendered adjustable, so that they can be kept of proper length to operate the mechanism exactly, by means of the adjusting-nuts $f$ on one end of one part of each of the rods F F'. A tube, $f'$, (see Fig. 5,) is slipped over the thread on which this nut moves, so as to prevent the device $F^2$ from wearing said threads as it slides back and forth.

The device as a whole is very simple and inexpensive, and has no springs or other delicate parts to get out of order. As will be noticed, my improved gate is of that class which swing always from the approaching team, without regard to the direction from which it is approaching, which have manifest advantages over those which swing always in one direction.

Having thus fully described my said invention, what I claim as new, and desire to secure by Letters Patent, is—

1. In a swinging gate, the gate-post B, having spiral plate H, pivoted on arms or brackets secured to the outer end of said post, and connected with gate A by arm $h$, and adapted to be rotated a given distance in opposite directions, substantially as and for the purpose set forth.

2. The combination of the gate, the spiral device H, the bell-crank lever G, the connecting-rods, and the trip-rods, substantially as set forth.

3. In combination, the swinging gate A, post B, spiral plate H, slotted lever G, and connecting-rods F and F', with the trip-bails E and E', substantially as shown.

4. In combination, the swinging gate A, post B, spiral plate H, lever G, rods F and F', with bars I, levers I', and trip-bails E and E', substantially as shown and specified.

5. The combination of the gate A, posts B, C, D, and D', trip-rods E E', connecting-rods F F', bell-crank lever G, and spiral device H, having arm $h$, substantially as set forth.

In witness whereof I have hereunto set my hand and seal, at Joppa, Indiana, this 10th day of July, A. D. 1882.

DAVID GIBBONS. [L. S.]

In presence of—
 W. A. HUNT,
 J. M. BISHOP.